Oct. 22, 1929.  W. F. CORNELIUS  1,732,789
BELT CLAMP AND TIGHTENER
Filed March 18, 1926
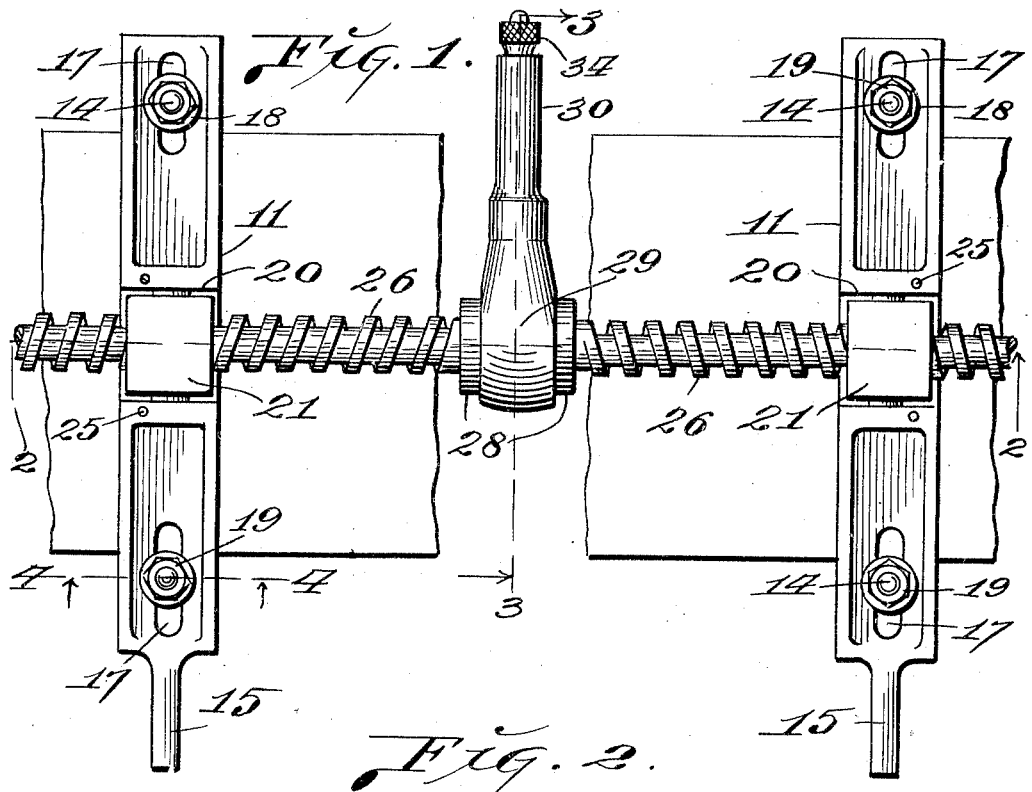
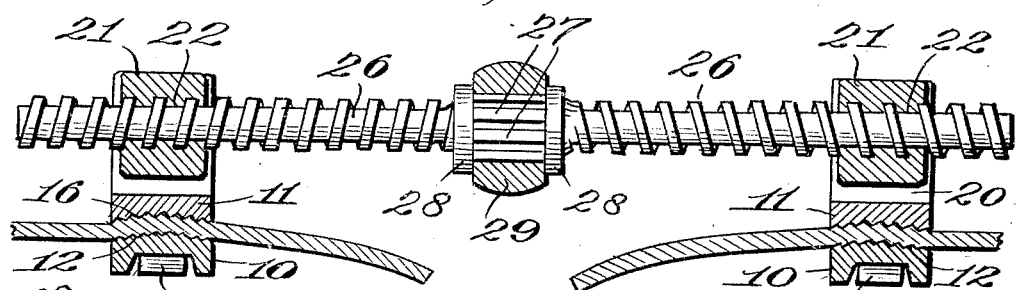
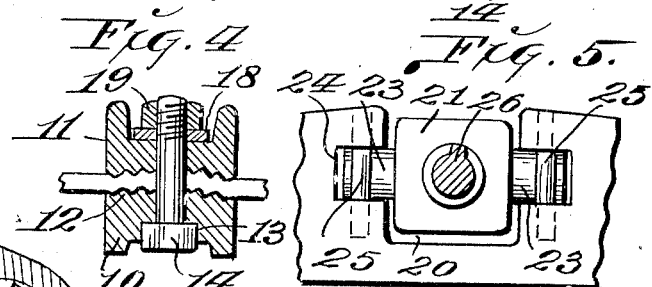
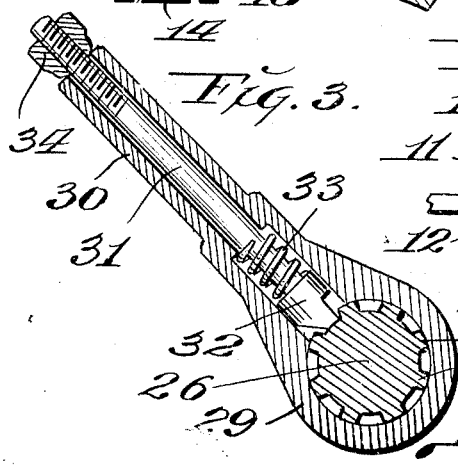
Inventor:
W. F. Cornelius.
By Martin P. Smith Atty.

Patented Oct. 22, 1929

1,732,789

UNITED STATES PATENT OFFICE

WESLEY F. CORNELIUS, OF WHITTIER, CALIFORNIA

BELT CLAMP AND TIGHTENER

Application filed March 18, 1926. Serial No. 95,695.

My invention relates to a belt clamp and tightener and has for its principal object the provision of a relatively simple, practical and efficient device that may be advantageously used for clamping and drawing together the ends of power belts and particularly the larger sizes of belts which, by reason of their size and weight, cannot be readily manipulated by hand.

The device embodying the principles of my invention is particularly designed for drawing the ends of a belt together in order that said ends may be securely fastened, and which operations are necessary in the event that a break occurs in the belt or when it is necessary to take up slack in said belt.

Further objects of my invention are to generally improve upon and simplify the construction of the existing forms of belt clamps and tighteners; to provide a device of the character referred to that may be easily and quickly applied to a belt and manipulated with little power in order to draw the ends of the belt toward each other; and further, to provide a belt clamp and tightener that is inexpensive of manufacture and which will be very effective in performing the functions for which it is intended.

With the foregoing and other objects in view, my invention consists in certain novel features of construction and arrangement of parts that will hereinafter be more fully described and claimed and illustrated in the accompanying drawing, in which—

Fig. 1 is a top plan view of a belt clamp and tightener of my improved construction in position for use on a belt.

Fig. 2 is a vertical section taken on the line 2—2 of Fig. 1.

Fig. 3 is an enlarged cross section taken on the line 3—3 of Fig. 1.

Fig. 4 is an enlarged cross section taken on the line 4—4 of Fig. 1.

Fig. 5 is an elevational view of the central portion of one of the belt clamping members.

The preferred embodiment of my invention includes a pair of belt clamping members that are identical in construction and each member being formed in two parts, a lower bar 10 and an upper bar 11. The upper surface of the lower bar 10 is slightly convex in cross section and said surface is formed with a series of longitudinally disposed ribs 12.

Seated in recesses 13 that are formed in the underside of the end portions of the lower bar are the heads of upwardly projecting bolts 14. Formed integral with one or both ends of each upper bar are outwardly projecting handles such as 15 that are adapted to be manually engaged when the device is applied to a belt in order to hold the belt against its tendency to rotate laterally or sidewise, while the clamping members are being drawn toward each other.

The under face of each upper bar 11 is formed slightly concave in cross section to correspond with the curvature of the upper face of lower bar 10, and formed in the concave under face of said upper bar is a series of longitudinally disposed ribs 16. When the upper and lower bars are drawn together to clamp an interposed belt, the ribs 12 and 16 tend to "bite" into the surface of the belt and thereby very firmly grip the same between the clamping bars.

Formed through the end portions of each upper bar 11 are short longitudinally disposed slots 17 through which pass the upper portions of the bolts 14 and arranged on the projecting portions of said bolts are washers 18 and nuts 19. The parts just described provide simple means for very firmly clamping the bars upon a belt.

Formed in the upper portion of each upper bar 11 is a rectangular opening 20 within which is positioned a block 21. One of these blocks is provided with a horizontally disposed aperture 22 having a right hand thread and the other block is provided with a corresponding aperture having a left hand thread. Each block is provided on its sides with outwardly projecting trunnions 23 that are received in recesses 24, the latter being formed in bar 11 to the sides of openings 20 and said trunnions being retained in said openings in any suitable manner, preferably by means of pins 25 that are seated in bar 11 to the sides of said trunnions.

A rod or shaft 26 that is provided with right and left hand threaded portions that pass through the respective blocks 21 is provided at its center with a series of ratchet teeth 27 and formed on said shaft between these ratchet teeth and the threaded portions of said shaft are collars 28.

Mounted to rotate freely upon the toothed portion of the shaft between the collars 28 is a head portion 29 of a short tubular handle 30 through which passes a rod 31, the lower end of which is provided with a pawl 32, the point of which is adapted to engage between the ratchet teeth 27. Interposed between this pawl and a shoulder that is formed within the tubular handle is an expansive coil spring 33. The upper portion of rod 31 projects a short distance beyond the upper end of tubular handle 30 and said projecting end is threaded and receives a nut 34.

By manipulating this nut so as to draw rod 31 upwardly through the handle, the pawl 32 may be disengaged from ratchet teeth 27, and when the position of said pawl has been reversed and the rod lowered so as to permit the point of the pawl to re-engage with the ratchet teeth, the handle may be used for rotating the threaded rod 26 in either direction.

In taking up the slack in a belt with my improved device, the clamping members 10 and 11 are applied to the belt on opposite sides of the joint therein and said members are clamped to the belt by tightening the nuts 19 on the bolts 14, thus drawing the bars 10 and 11 together. Tubular handle 30 is now manually engaged and swung through the arc of a circle with threaded shaft 26 as an axis and as a result of the engagement of pawl 32 with the ratchet teeth 27, the threaded shaft 26 is rotated. The engagement of the right and left hand threads on shaft 22 with the blocks 21 draws the clamping members toward each other and consequently takes up the slack in the belt. The belt fastening means on the ends between the pair of clamping members is removed when the slack has been taken up and a new fastening made, thereby accomplishing the desired result.

The resistance offered by the belt to the "pull" of the clamping bars on the ends of said belt tends to rock said bars on the axes formed by the trunnions 23 of the blocks 21 and as a result, the ends of the belt that project toward each other from the clamping bars will be bent downwardly or outwardly away from the central portion of the threaded rod and the handle 30 thereon thus automatically positions the ends of the belt so that they may be readily engaged while the fastening means is being detached and replaced.

The operations incident to the use of my improved belt clamp and tightener when drawing the ends of the broken belt together are practically the same as the operations described in connection with the taking up of slack in a belt.

The slots 17 in the ends of the upper bars of the belt clamping members enable the bolts 14 to be adjusted lengthwise of the clamping members in order to accommodate belts of different widths.

Thus it will be seen that I have provided a belt clamping and stretching device that is relatively simple in construction and operation and which may be advantageously employed in the repair and adjustment of belts and particularly belts that are extra heavy or of great length.

It will be understood that minor changes in the size, form and construction of the various parts of my improved belt clamp and tightener may be made and substituted for those herein shown and described without departing from the spirit of my invention, the scope of which is set forth in the appended claim.

I claim as my invention:

In a belt clamp and tightening device, two pairs of clamping bars, each pair comprising a lower member and an upper member, the inner faces of which members are corrugated for gripping engagement with a belt, a handle formed integral with and projecting outwardly from one end of the upper member of each pair for manipulation of the device, the ends of the upper member of each pair of bars being provided with longitudinally disposed slots, bolts seated in the ends of the lower member of each pair and projecting upwardly through the slots in the upper member, nuts seated on the upper ends of said bolts, a block pivotally mounted on the central portion of the upper member of each pair of clamping bars, each block being provided with a threaded aperture, a rod having right and left hand threaded portions that pass respectively through the pivotally mounted blocks, a hand lever journaled on the intermediate portion of said threaded rod, and a ratchet and pawl connection between said hand lever and said rod.

In testimony whereof I affix my signature.

WESLEY F. CORNELIUS.